June 18, 1940.   F. P. HEALY   2,204,855
BORING HEAD
Filed Nov. 5, 1937   2 Sheets-Sheet 2

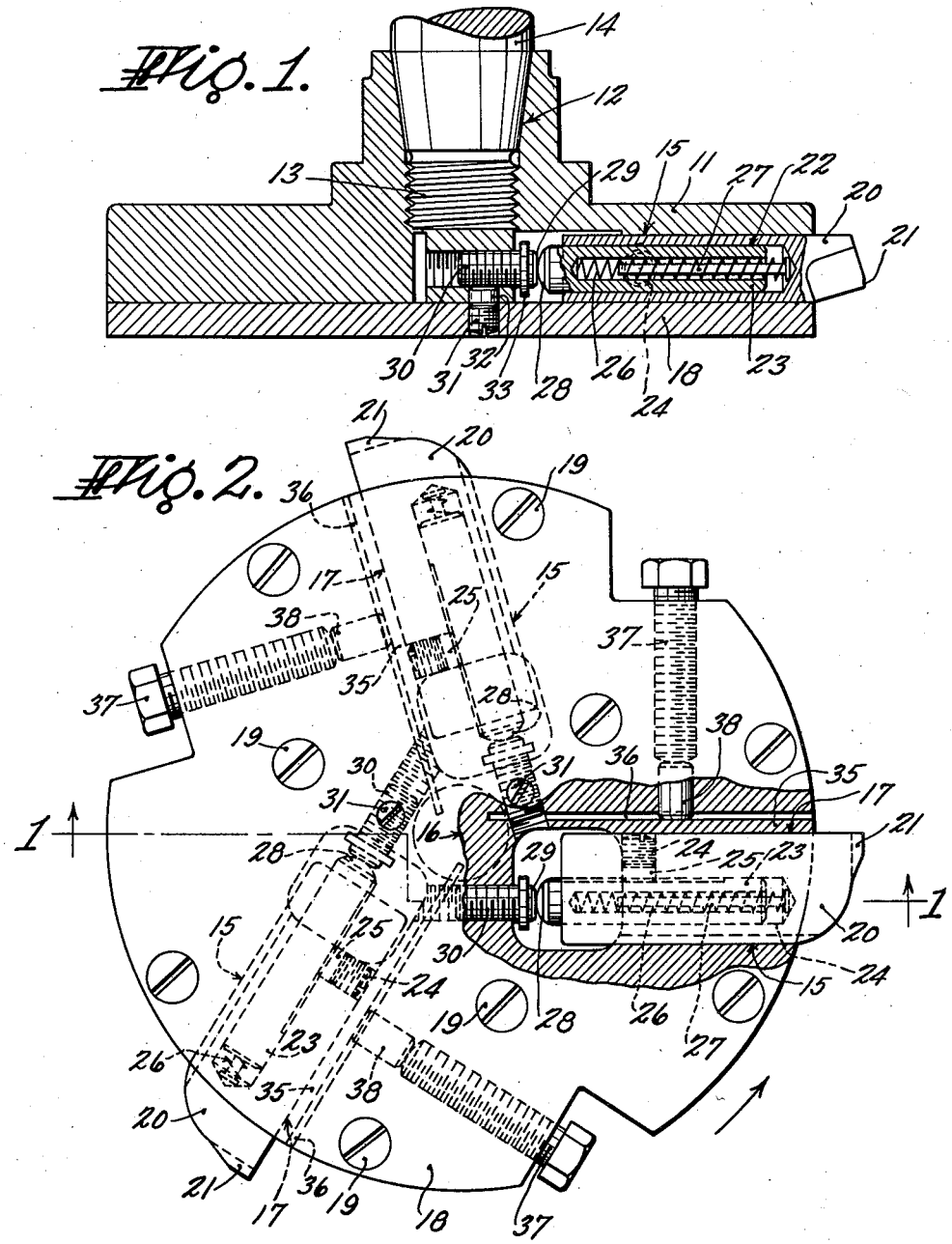

INVENTOR
*Francis P. Healy*
BY *Chapin & Neal*
ATTORNEYS

Patented June 18, 1940

2,204,855

UNITED STATES PATENT OFFICE 2,204,855

BORING HEAD

Francis P. Healy, Springfield, Mass., assignor to Van Norman Machine Tool Company, Springfield, Mass., a corporation of Massachusetts Application November 5, 1937, Serial No. 172,879

4 Claims. (Cl. 77—58)

This invention relates to boring heads of the multiple cutter type, and has for its main purpose the provision of a boring head having extensible cutters capable of being set while removed from the head so as to predetermine the effective boring radius of each cutter individually.

One object of the invention is to provide a boring head of greater adaptability for different uses than has hitherto been possible. Thus, the improved boring head can be used either as a multiple cutter head or as a single cutter head without changing the manner or the accuracy by which the effective boring radius of the cutters is predetermined, and without affecting the rotative balance of the boring head. Furthermore, by employing cutters set to cut in different axially spaced planes the boring head can be used to make both roughing and finishing cuts simultaneously without departing from the accuracy with which the several cutters can be set. By using cutters set to cut in the same plane the boring head can be used to divide the work between the cutters, an improved result being obtained on account of the accuracy with which the effective boring radii of the several cutters can be set with perfect uniformity.

A further object is to provide a multiple cutter head in which the necessity is avoided of grinding the cutter blades while assembled in the head in order to insure that they shall have identical effective boring radii. By reason of the elimination of the grinding of the assembled cutter head the contour and angles of the cutting portions of the blades are not limited to those which can be produced by grinding all of the blades simultaneously; but can be determined in accordance with what experience has shown to be most satisfactory for boring operations.

A further object is to increase the speed and accuracy with which the several cutters can be set, and to make these factors independent of the sharpening of the cutters. It is possible with the present invention, I believe for the first time in multiple bladed cutters, to sharpen one cutter of the set and to replace it with no loss of accuracy in its effective boring radius or in its relationship to the other cutters.

A further object is to make a cutter head composed in effect of a plurality of fly cutters spaced axially one from another a comparatively small distance sufficient, however, to cause each cutter to act only on the bore finished by the cutter preceding it; thereby causing them to act as far as their rotative balance and the balance of their individual thrusts on the boring bar are concerned like a multiple bladed cutter, but as far as their adaptability to cut progressively is concerned as separate and independent cutting elements.

The invention will now be described in connection with the accompanying drawings, in which—

Fig. 1 is a median section, on line 1—1 of Fig. 2, of a boring head embodying the invention;

Fig. 2 is a bottom plan view, partly broken away;

Figure 3:
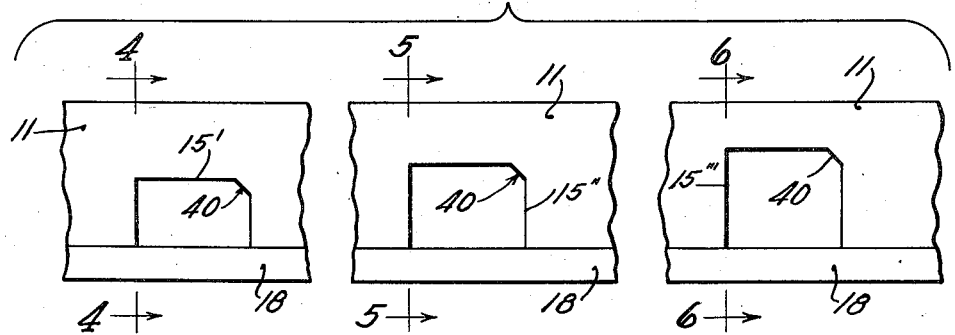
Fig. 3 is a developed peripheral surface of a boring head constructed in accordance with Figs. 1 and 2, illustrating the method of mounting the cutters when it is desired that they shall act progressively on the work.
Figures 4, 5, 6:
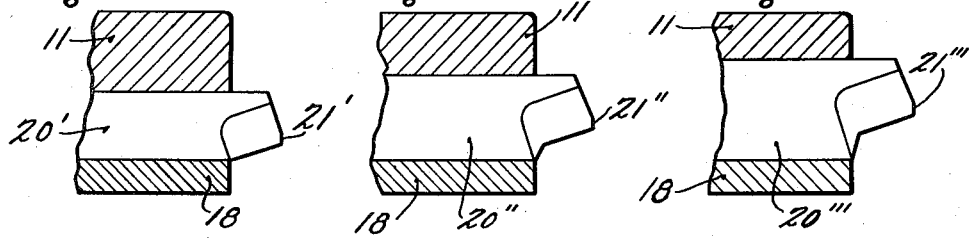
Figures 7, 8, 9:
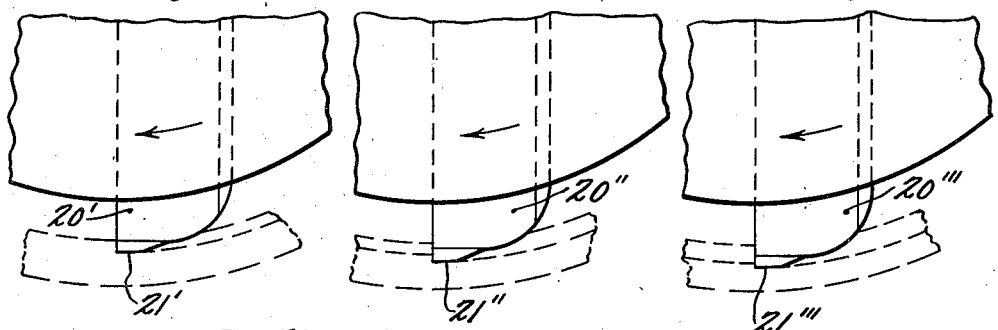
Figure 10:
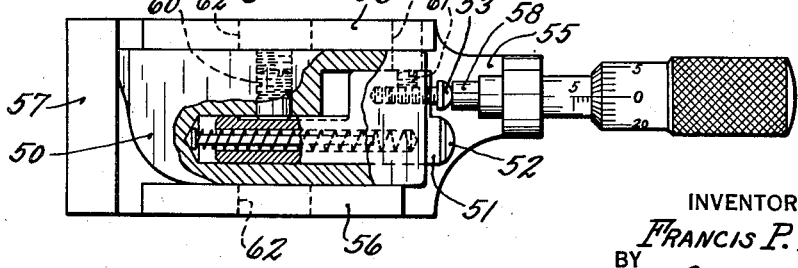

Figs. 4, 5, and 6 are sections on line 4—4, 5—5, and 6—6 of Fig. 3;

Figs. 7, 8, and 9 are top plan views of the cutters shown in Figs. 4, 5, and 6 respectively; and Fig. 10 is a plan view of an improved form of cutter, showing the manner of adjusting it while removed from the cutter head.

The boring head is composed of a body 11 provided with means such as a taper socket 12 and screw threads 13 for securing it to a boring bar 14. Since mechanism for mounting and driving the boring bar is standard in the art it need not be described here. By its operation the boring bar is caused to rotate and to move slowly at the same time in the direction of its axis. The body 11 is provided with a plurality of grooves or guideways 15 lying in a plane perpendicular to the axis of rotation 16 and preferably arranged eccentrically with respect thereto but having one side 17 substantially radial for a purpose to appear. To avoid chattering the guideways are preferably unevenly spaced around the boring head. A plate 18 covers the bottom of the body 11, and forms the bottoms of the several guideways 15, being held in place as by screws 19.

Within each guideway is receivable a cutter 20 machined so as to fit the guideway snugly. The outer end is provided with a cutting portion or bit 21 preferably of some hard material such as tungsten carbide, ground to the angular form best suited for boring the material which is to be worked. Running in a recess 22 in the cutter is a plug 23 held in position by a set screw 24 acting on a short cylinder 25. The plug is itself hollow; having a spring 26, supported against collapse by a rod 27, extending into it from the bottom of the recess to press the plug outwardly when the screw 24 is released. The end 28 of the plug is rounded to serve as an abutment to contact an abutment 29 on the end of a screw 30 threaded into the body 11 and held in position by a set screw 31 acting through a small cylinder 32. The screw 30 is preferably provided with an integral nut-like portion 33 by which it may be adjusted, when set screw 31 is loosened and the cutter 20 removed, through the open end of the guideway 15. The cutter is held in position by a gib 35, preferably formed integral with the body by means of a saw cut 36, which is pressed against the cutter by a set screw 37 acting through a small cylinder 38.

The cutters 20 can be set independently of each other to a predetermined length by a micrometer fixture such as is described in the patent to Arp 1,906,241, May 2, 1933. As is fully described in that patent, the length to which the tool is set is added to the distance from the abutment 29 to the axis to give the effective boring radius of the tool, the micrometer being preferably graduated so as to give a direct reading of the diameter which will be bored. To give such a direct reading the distances measured and added must be taken in the same direction and parallel to the radius of the tool. In the present design the guideway for receiving the tool is eccentric with respect to the axis of revolution of the boring head, but the cutting edge of the tool always lies on a radial line from the axis of rotation irrespective of its degree of extension, so that if the tool is measured along this line while removed from the boring head the micrometer by which this measuring is done can be graduated to read directly without error. The eccentricity of the abutment 29 with respect to the axis of rotation of the boring head introduces no error provided the micrometer is arranged to measure the overall dimension of the cutter not along the oblique line running from the abutment 29 to the cutting edge 21, but between planes perpendicular to the radius drawn from the axis to the cutting edge.

The arrangement described permits of greater flexibility in the use of the cutting tool than has been attainable with such devices as have been available formerly. The use thus far described is broadly similar to the usual multi-bladed cutter head except that the individual cutters can be sharpened and set individually while removed from the boring head. If it is desired to use only one of the cutting tools the remainder of the tools can be adjusted so that their cutting edges lie within the minimum diameter of the hole being bored. In this way all the tools may be left in their sockets even though one alone is in use, and the boring head kept from becoming unbalanced by the omission of the weight of any of the cutting tools. The boring head may also be used with the several tools set to different diameters and with their cutting edges spaced apart in an axial direction, either for the purpose of producing a work piece having several diameters or to produce the equivalent of roughing and finishing cuts by the same boring head, as will now be described.

Fig. 3 is a development of the periphery of the boring head showing the adaptability of the invention to the production at one operation of successive bores of different diameters. In this case the sockets 15', 15'', and 15''' are made of different sizes so that the tools 20', 20'', and 20''' cannot be interchanged accidentally. Each socket preferably has one corner 40 beveled, so that the tool can be put in in only one way. As is shown in Figs. 4, 5, and 6 and in Figs. 7, 8, and 9, which represent side and top views of the several cutters, the cutting edges 21', 21'', and 21''' are formed and adjusted so that they not only vary progressively in their radial extension but are displaced axially from one another. Assuming that the cutters are to be used for roughing and finishing the bore in one operation, the cutter 20' which contacts the bore first has the least radial extension; and the cutters 20'' and 20''' have progressively greater radial extensions.

The cutter 20'' has its cutting edge so displaced axially that it will contact the bore only on that portion which has previously been cut by the preceding cutter 20', and the cutter 20''' is similarly disposed with respect to the cutter 20''.

It will be seen that the several cutters can be set to take the same or different depths of cut, and that the several cutters may be removed individually for sharpening and can be reset to size without disturbing the other cutters. It is common practice to have a tandem arrangement of roughing and finishing cutters, but the necessary axial separation between the two sets of cutters does not permit the realization of the same advantages as in the present case. It will be understood that the axial separation of the cutters in my invention (which has been exaggerated in the drawings for clarity) need only be sufficient so that the cutters other than the first contact only with the portion of the bore cut by the preceding cutters. This permits a separation of a small fraction of an inch, and allows an overall length of the cutter head only slightly greater than would be true were the cutters to be set to cut simultaneously. This allows the tandem method to be used in spaces which would not permit the use of former tandem cutters. The complete independence of the cutters also makes it possible, even in a single cutter head, to have the several cutters ground individually to the contour especially suited for their specialized duties.

In Fig. 10 is shown a slightly different type of cutter mounting and a micrometer for setting it to size, useful where the cutters are to be set to bore progressively increasing diameters. In this case, instead of having the single abutment 28 which contacts the stationary abutment 29, the cutter body 50 is provided with a member 51 mounted for sliding movement in the cutter body in the same way as the member 23, but carrying both an abutment 52 similar to abutment 28 and a separately adjustable abutment 53 for a purpose to appear. The abutment 53 when once set always maintains its relationship to the abutment 51 irrespective of any change in the adjustment of the latter. Before considering the operation of this type of cutter the manner in which it may be adjusted will be described. A micrometer fixture is shown in Fig. 10, having a base 55 provided with side guides 56 to guide the tool and an end abutment 57 finished square and true with the side guides. The tool can be placed in the fixture either side up, bringing either abutment 52 or abutment 53 into alignment with the stem 58 of a micrometer preferably adjusted as specified in Patent 1,905,241 to read directly the diameter which the tool will cut and not the length of the tool. The member 51 is held by a set screw 60 and the abutment 53 by a set screw 61, holes 62 and 63 being provided in the fixture 56 to provide access thereto.

In use, each of the three tools is first separately adjusted so that there is a predetermined difference in setting between the abutments 52 and 53. Assuming for illustrative purposes that a total cut of nine one-thousandths of an inch is to be taken into the wall and that each cutter is to take one-third of the total, cutter 20' will have its abutment 53 set six one-thousandths of an inch outwardly from its abutment 52, as by measuring abutment 52 and then reversing the cutter in the micrometer fixture and setting the abutment 53 to the correct differential. Cutter 20'' has its abutment 53 projecting only three one-thousandths, and cutter 20''' has its two abutments equal. When once set in the manner the three cutters are treated as if they were identical. Each is set to the size of the desired bore in the micrometer fixture by the abutment 53 disregarding the difference between the cuts they are to make. The cutters are then set in their respective sockets and positioned by their abutments 52. Since this abutment on cutter 20' was set six one-thousandths of an inch inside abutment 53 the cutting edge of the cutter will lie that distance short of the boring radius for the final cutter 20''', even though no difference is made in the method of setting them to size. Since the cutters have to be removed and sharpened frequently, the fact that they can all be set to the same reading of the micrometer is of value in avoiding errors.

I claim:

1. A boring head comprising a body rotatable around a fixed axis, a plurality of outwardly opening tool receiving guideways therein, said guideways lying in a plane perpendicular to the axis of rotation, an abutment associated with each guideway, a single extensible fly-cutting boring tool receivable in each of the guideways and having an abutment positioned for contact with the abutment associated with its guideway, the cutting edges of each of the several tools being axially spaced from each other so as to permit progressive cutting action on the work, means carried by each tool for fixing the length between its abutment and its cutting edge while the tool is removed from the boring head independently of the other tools, said guideways being so positioned that the locus of the cutting edge of each tool for different degrees of extension of said tool sufficiently approximates a radial line at right angles to the axis of rotation of the boring head as to permit the size of hole to be bored by each tool to be predetermined independently of any other tool by calipering the tool substantially in the direction of extension of such tool while removed from the boring head.

2. A boring head comprising a body rotatable around a fixed axis, a plurality of outwardly opening tool receiving guideways therein, said guideways lying in a plane perpendicular to the axis of rotation, an abutment associated with each guideway, a single extensible fly-cutting boring tool receivable in each of the guideways and having an abutment positioned for contact with the abutment associated with its guideway to determine the position of the tool relative to the axis of rotation, the cutting edges of each of the several tools being axially spaced apart from each other so as to permit progressive cutting action on the work, means carried by each tool for fixing the length between its abutment and its cutting edge while the tool is removed from the boring head independently of the other tools, said guideways being so positioned that the locus of the cutting edge of each tool for different degrees of extension of said tool sufficiently approximates a radial line at right angles to the axis of rotation of the boring head as to permit the size of hole to be bored by each tool to be predetermined independently of any other tool by calipering the tool substantially in the direction of extension of such tool while removed from the boring head, and means to introduce and predetermine a variation between the calipered extension of each tool and its effective boring radius independently of each other tool.

3. A boring head comprising a body rotatable around a fixed axis, a plurality of outwardly opening tool receiving guideways therein, said guideways lying in a plane perpendicular to the axis of rotation, an abutment associated with each guideway, a single extensible fly-cutting boring tool receivable in each of the guideways and having a cutting edge, a measuring abutment, and an abutment positioned for contact with the abutment associated with its guideway to determine the position of the tool relative to the axis of rotation, the cutting edges of each of the several tools being axially spaced apart from each other so as to permit progressive cutting action on the work, means carried by each tool for fixing the length between the cutting edge and its two abutments considered as a unit, means carried by each tool for varying and fixing the relative positions of the two abutments on the tool, said guideways being so positioned that the locus of the cutting edge of each tool for different degrees of extension of said tool sufficiently approximates a radial line at right angles to the axis of rotation of the boring head as to permit the size of hole to be bored by each tool to be predetermined independently of any other tool by calipering the tool between its cutting edge and its measuring abutment while removed from the boring head, the variation between the two abutments carried by each tool permitting the introduction and predetermination of a variation between the calipered extension of each tool and its effective boring radius independently of each other tool, whereby all tools can be calipered to the desired finished diameter of the bore and certain tools will be set to cut a lesser diameter in preparation for the final cut.

4. A boring head comprising a body rotatable around a fixed axis, a plurality of outwardly opening tool receiving guideways therein, said guideways lying in a plane perpendicular to the axis of rotation, an abutment associated with each guideway, a single extensible fly-cutting boring tool receivable in each of the guideways and having an abutment positioned for contact with the abutment associated with its guideway, the several guideways and tools being formed so as to prevent interchange of tools within the guideways and so that the cutting edges of each of the several tools will be axially spaced from each other so as to permit progressive cutting action on the work, means carried by each tool for fixing the length between its abutment and its cutting edge while the tool is removed from the boring head independently of the other tools, said guideways being so positioned that the locus of the cutting edge of each tool for different degrees of extension of said tool sufficiently approximates a radial line at right angles to the axis of rotation of the boring head as to permit the size of hole to be bored by each tool to be predetermined independently of any other tool by calipering the tool substantially in the direction of extension of such tool while removed from the boring head.

FRANCIS P. HEALY.